US008060672B2

(12) United States Patent
Maul et al.

(10) Patent No.: US 8,060,672 B2
(45) Date of Patent: Nov. 15, 2011

(54) EVENT SIGNALING BETWEEN PERIPHERAL MODULES AND A PROCESSING UNIT

(75) Inventors: Jürgen Maul, Sulzbach-Rosenberg (DE); Albert Tretter, Pirk (DE); Hermann Zenger, Wernberg-Köblitz (DE); Wolfgang Ziemann, Höhenkirchen-Siegertsb (DE)

(73) Assignee: Siemens Aktiengesellschaft, Munich (DE)

( * ) Notice: Subject to any disclaimer, the term of this patent is extended or adjusted under 35 U.S.C. 154(b) by 223 days.

(21) Appl. No.: 11/811,941

(22) Filed: Jun. 12, 2007

(65) Prior Publication Data
US 2008/0005428 A1 Jan. 3, 2008

(30) Foreign Application Priority Data
Jun. 12, 2006 (EP) .................................... 06012059

(51) Int. Cl.
*G06F 3/00* (2006.01)
*G06F 5/00* (2006.01)
*G06F 13/12* (2006.01)
*G06F 13/38* (2006.01)
*G06F 13/36* (2006.01)
*H04L 1/02* (2006.01)
*G01R 31/08* (2006.01)

(52) U.S. Cl. ............... 710/65; 710/40; 710/44; 710/62; 710/116; 710/308; 375/347; 370/232

(58) Field of Classification Search .................. None
See application file for complete search history.

(56) References Cited

U.S. PATENT DOCUMENTS

| 4,486,739 | A | | 12/1984 | Franaszek et al. |
| 5,613,115 | A | * | 3/1997 | Gihl et al. ................. 717/123 |
| 6,272,190 | B1 | * | 8/2001 | Campana, Jr. ............. 375/347 |

(Continued)

FOREIGN PATENT DOCUMENTS

GB 2396445 A * 6/2004

(Continued)

OTHER PUBLICATIONS

Kembel, Robert W. Comprehensive Fibre Channel. Tucson, Arizona: Northwest Learning Associates, Inc. 2003.*

(Continued)

*Primary Examiner* — Tariq Hafiz
*Assistant Examiner* — Henry Yu (57) ABSTRACT

There is described a method, a bus protocol, a peripheral module, a processing unit, a hub and also to a system consisting of said components, for event signaling between at least one peripheral module and a processing unit by means of a system bus. In this case the data to be transmitted data is encoded into a larger symbol space, from which a standard idle symbol is used in telegram pauses for synchronizing a connection between transmitter and receiver. A message present at the peripheral modules is enabled to be signaled to the processing unit independently of the telegram traffic initiated by the processing unit. This is achieved by a peripheral module wishing to signal an event to the processing unit sending to the processing unit in a telegram pause, instead of the standard idle character, a signaling sequence consisting of an alarm idle symbol and an alarm identifier which contain information about the relevant event as well as the module address of the peripheral module at which the event is present, with the information about the event also being transcoded into the larger symbol space.

19 Claims, 3 Drawing Sheets

U.S. PATENT DOCUMENTS

| | | | |
|---|---|---|---|
| 6,449,545 B1 * | 9/2002 | Nitschke et al. | 701/45 |
| 6,665,873 B1 * | 12/2003 | Van Gestel et al. | 725/136 |
| 6,701,405 B1 * | 3/2004 | Adusumilli et al. | 710/308 |
| 7,007,107 B1 * | 2/2006 | Ivchenko et al. | 709/250 |
| 7,451,244 B2 * | 11/2008 | Kostadinov | 710/11 |
| 7,633,869 B1 * | 12/2009 | Morris et al. | 370/232 |
| 2004/0105456 A1 * | 6/2004 | Lanzone et al. | 370/429 |
| 2006/0149992 A1 * | 7/2006 | Shima | 714/4 |

FOREIGN PATENT DOCUMENTS

| | | |
|---|---|---|
| WO | WO 02/088966 A1 | 11/2002 |
| WO | WO 02088966 A1 * | 11/2002 |
| WO | WO 2005/074226 A1 | 8/2005 |
| WO | WO 2005074226 A1 * | 8/2005 |

OTHER PUBLICATIONS

Kembel, Robert W. In-Depth Fibre Channel Arbitrated Loop. Tucson, Arizona: Northwest Learning Associates, Inc. 2003.*

Robert W. Kembel; "Comprehensive Fibre Channel, Chapters 1 and 9"; 2003, Pages; XP00240390; ISBN: 0-931863-83-2; Northwest Learning Associates, Inc., Tucson, Arizona.

Robert W. Kembel; "In-Depth Fibre Channel Arbitrated Loop"; 2003; pp. 109-112; XP002404066; Northwest Learning Associates, Tucson, Arizona.

* cited by examiner

EVENT SIGNALING BETWEEN PERIPHERAL MODULES AND A PROCESSING UNIT

CROSS REFERENCE TO RELATED APPLICATIONS

This application claims priority of European application No. 06012059.9 EP filed Jun. 12, 2006, which is incorporated by reference herein in its entirety.

FIELD OF INVENTION

The invention relates to a method for event signaling between at least one peripheral module and a processing unit by means of a system bus, with the system bus being operated by a system bus master which reads data from the peripheral modules or can transmit data to these modules, with the data comprising of individual symbols, which are transcoded for transmission in a bit transmission layer at a transmitter by an encoder into a larger symbol space and converted back again at a receiver by a decoder, with a telegram method in accordance with the request/response paradigm being used for the data transmission, in which specific characters from the larger symbol space are used to identify the start and end of a telegram and a standard idle symbol is used in telegram pauses for synchronizing a connection between the transmitter and the receiver.

The invention further relates to a bus protocol which is based on said method, as well as to a peripheral module, a processing unit and a hub for event signaling according to the said method. Finally the invention relates to a system comprising the said components, in which the said method is used by employing the said bus protocol.

BACKGROUND OF THE INVENTION

Such a method or such a system with the said components using the said bus protocol is employed in all areas in which peripheral modules communicate with a processing unit via a system, as is especially the case in automation technology. The main requirements here are as follows: The system bus master must be able to access the peripheral module by direct access as quickly as possible and with little latency time, the peripheral modules should be able to communicate pending alarms or pending communication requests to the system bus master as quickly as possible and the communication linkage of the peripheral modules must be able to be implemented in a cost-effective manner. In such cases either the (central) processing unit (CPU), which processes the data of the peripheral modules, or an interface module, which establishes the decentralized link via a field bus between the peripheral modules and the central processing unit, functions as the system bus master. The peripheral modules are the input and output modules which receive data from the system bus master or from which the system bus master can read data. In automation technology the peripheral modules establish the connection to the automation process. Furthermore, if the components are connected in accordance with a backplane structure, the use of a hub is possible, which behaves like a peripheral module as regards event signaling.

Regardless of the configuration, the communication sequence on the system follows the known procedures: The pending jobs are prioritized by a scheduler in the system interface of the system bus master and sent over the system bus to the peripheral modules. The peripheral modules may only send data on the bus if they have received a request from the CPU, i.e. the system bus master addresses a peripheral module through a request and waits for an appropriate response. Because of process or diagnostic events however the peripheral modules must also be able themselves to send a message to the CPU which must be transported to the CPU and processed there as quickly as possible. Since a large number of peripheral modules (typically up to 64) are able to be plugged into a system, control must be provided through a special transport mechanism for the messages to the CPU, since in the worst case all peripheral modules want to send a message to the CPU at the same time. In principle access to the bus by the individual bus users/stations, if they wish to send a message, can be defined in different ways.

With Profibus for example there is a token which is exchanged between the master stations. Only the station which has the token may send a message on the bus. All other stations are passive. This means that stations, i.e. the said peripheral modules, may only send a message to the CPU if they have the token. The result is that the reaction time is dictated by the circulation of the token. The token method (token ring, bus) currently operates at baud rates of up to 100 Mbit/s. There is no known system which operates at higher baud rates.

Profibus also supports a polling method in which the master polls all slaves, i.e. the said peripheral modules, and reads the data from the peripheral modules or writes it into the peripheral modules. In this case the reaction or response time depends on the poll cycle of the CPU, until a module can signal to the CPU that there is an alarm or communication request.

With Ethernet the switched networks have come to the fore at 100 Mbit/s. The throughput and the reaction time in such cases are heavily dependent on the available telegram memory in the individual switches and the arrangement (topology) of the switches and the users. Each user may send at any point in time. There is no guarantee however of when the message arrives at the receiver, the CPU in the case of event signaling. This depends on the remaining volume of telegrams. If a collision occurs because two users are sending simultaneously, this collision is resolved by the memory in the switch. The message arriving somewhat later is buffered in the switch and sent after the completion of the first message. There are now also systems (e.g. PROFINET) which use planning to prevent the collision in Ethernet, but this again leads to the users only being allowed to send their spontaneous communication requests, such as alarms for example, at specific, times. Ethernet offers baud rates of 10, 100 and 1000 Mbit/s and beyond.

There are also other systems (CAN-based solutions) in which the bus access and the telegram transmission are regulated by a pure priority control. Each telegram contains a prio field which uniquely prioritizes the messages. The bus access logic evaluates this field and lets the message with the highest priority pass. This type of message transfer is feasible with baud rates up to around 10 Mbit/s, beyond this there is no known system which operates with a solution of this type.

With many automation systems an additional hardware line is provided for the message path from the peripheral modules to the CPU. Here, for an active line, the system bus master had to read out the status from the peripheral modules and determine which module may issue a message to the CPU, after which the CPU could then actively read the message from the peripheral module. This resulted in a high latency time since the CPU did not immediately know on which peripheral module which message was present.

Since the CPU cannot know which module wishes to transmit a message to the CPU at which point in time, a solution is required, in which independently of the telegram processing by the CPU, a message can be transferred from the peripheral modules to the processing unit. Furthermore the system should be able to operate with baud rates of several hundred Mbit/s. A telegram method according to the request/response paradigm is thus suitable as a method or a system underlying the invention, in which the data which is made up of individual symbol, for transmission in a bit transmission layer for a transmitter is transcoded by an encoder into a larger symbol space and is converted back again at a receiver by a decoder and specific characters from the larger symbol space are used to identify start and end of a telegram and a standard idle symbol is used in telegram pauses for synchronizing a connection between the transmitter and the receiver.

8B/10B encoding is known for example from U.S. Pat. No. 4,486,739 A1, said encoding also being employed in Gigabit Ethernet. This means that the 8-bit symbols of the protocol layer in the transmitter are converted by a converter into 10-bit symbols which are then transmitted over the lines. At the receiver the 10-bit symbols are converted back by a decoder into 8-bit symbols. In this case the 10-bit symbols feature at least four level changes which guarantees DC balance and enables clock information for synchronization of the transmission stations to be obtained from the data stream.

At the 8-bit level a maximum of 256 symbols are possible, which through conversion to 10 bits can be distributed to 1024 symbols. The encoding rules used define that the 256 symbols are divided between two disjunctive symbol spaces in the 10-bit symbol space, which occupies 512 10-bit symbols. This means that 512 symbols remain which are not used as data symbols. From this additional symbol set certain symbols stand out because of their "safety margin" to other symbols. These symbols can be used to identify the start and the end of a telegram and to keep the connection between the transmit port and the receive buffer synchronized in the pauses between telegrams. These special symbols include a further class of symbols—also referred to as comma symbols—which even with any given combination of these symbols and other symbols do not create commas across symbol boundaries. These symbols are thus outstandingly well suited for determining the symbol boundaries within the data stream. In this 8B/10B encoding there are three such comma symbols. One of these, the standard idle symbol, is transmitted in the telegram pauses between the ports two of two modules. This means that the transmission is also synchronized in the telegram pauses. This applies for the direction from the CPU to the peripheral modules and also for the direction from the peripheral modules to the CPU.

This 8B/10B encoding is actually a combined 5B/6B and 3B/4B encoding. The DC freedom and integrated synchronization comes at a cost however of a 25% higher bandwidth requirement. A further development of this method exists with 64B/66B encoding, in which only approximately 3% more bandwidth is needed.

SUMMARY OF INVENTION

An object of the invention is to specify a method with which the peripheral modules independently of the telegram traffic which is initiated by the processing unit, can signal the presence of a message to the processing unit. Another underlying object of the invention is to specify a bus protocol which allows this type of communication between the peripheral modules and the processing unit on the system bus. The invention also has the underlying object of specifying a peripheral module, a processing unit and a hub as well as a system consisting of these components, with the components having means for signaling a message present at the peripheral modules to the processing unit independently of the telegram traffic which is initiated by the processing unit.

This object is achieved with a method of the type mentioned at the start such that a peripheral module which would like to signal an event to the processing unit, sends to the processing unit in a telegram pause, instead of the standard idle symbol, a signaling sequence which consists of an alarm idle symbol and an alarm identifier containing information about the relevant event as well as the module address of the peripheral module on which the event is present, with the information about the event also being transcoded into the larger symbol space.

The object is also achieved by a bus protocol, a peripheral module, a processing unit, a hub and a system, as described in the detailed description that follows.

From the signaling sequence the processing unit obtains the information that a message is available from a specific peripheral module which is to be fetched by the processing unit. Because the peripheral module involved instead of the standard idle symbol, sends an alarm idle symbol, followed by further information in the alarm identifier in the telegram pauses, there is practically no effect on the telegram traffic (request/response telegram) functionally and chronologically by the signaling sequence. This relieves the system bus master of coordination tasks. The processing unit can determine on the basis of the signaling sequences the widest variety of information. For example the processing unit detects immediately the peripheral module which is the source of the message. Furthermore, with this mechanism, one or more additional hardware lines for signaling of messages from the peripheral modules to the processing unit can be dispensed with.

In an advantageous embodiment the signaling sequence is interrupted at a given point in the symbol string if a request or a response telegram is sent. This ensures that there is no effect on normal data transmission. In addition a calculable, deterministic reaction time can be specified by this mechanism for the first signaling sequence, which displays a process alarm for example. This is composed of the pure transmission time of the signaling sequence and a possible latency time if a maximum-length telegram has to be transmitted before the signaling sequence.

In a further advantageous embodiment the processing unit is used as system bus master, allowing an additional interface module to be dispensed with.

In a further advantageous embodiment an interface module is used alternatively as system bus master, which establishes a coupling between the peripheral modules and the processing unit over a field bus, relieving the load on the processing unit.

In a further advantageous embodiment the signaling sequence is sent by the peripheral module until such time as the processing unit signals to the peripheral module, using corresponding telegrams, that the signaling sequence has arrived at the processing unit, achieving a maximum degree of security.

In further advantageous embodiments the processing unit and the peripheral module are connected to each other in a daisy-chain or a backplane layout. These are the usual basic forms of layout of a system bus which are simple to implement with the invention.

In a further advantageous embodiment the method is provided for event signaling in the area of automation technology, with the processing unit being embodied as a Programmable Logic Controller. In automation technology in particular there is the requirement for the peripheral modules to be able to communicate pending alarms or communication requests quickly to the system master, since the peripheral modules establish the connection to the automation process.

In a further advantageous embodiment the peripheral module features a sample stage for storing a signaling sequence to be sent. Since only one signaling sequence can be sent simultaneously, the first of possibly a number of events present must be determined in accordance with rules to be defined, with the resulting signaling sequence being retained in the sample stage.

In a further advantageous embodiment the peripheral module features at least one further transmitter and at least one further receiver for connection of further peripheral modules. This allows a daisy-chain-type structure in which the processing unit and the peripheral modules are connected to each other in series. In such a chaining arrangement the processing unit does not absolutely have to be at the end of the row but can also be in the middle of the row.

In a further advantageous embodiment the peripheral module features a hold stage for storing signaling sequences of further peripheral modules. For possible own signaling sequences present at the same time this enables, in accordance with rules to be defined, that event to be determined as the first event to be signaled for which the signaling sequence is fed to the sample stage.

In a further advantageous embodiment the peripheral module in this case features a priority stage for evaluation both of the own signaling sequences and also those of further peripheral modules and for forwarding the signaling sequence with the highest priority. The signaling sequences prioritized into this way feature in their alarm identifier a field for the allocated priority, so that the importance of the corresponding event can be read off directly from the signaling sequence.

In a further advantageous embodiment a signaling sequence defined by a priority scheme applicable on the system bus is able to be forwarded by the priority stage if signaling sequences of the same priority are present, which avoids possible conflicts.

In a further advantageous embodiment the processing unit features at least one further transmitter and at least one further receiver for connecting further peripheral modules. This means that the processing unit can also be connected in a daisy-chain structure between two peripheral modules or in a backplane structure without an additional hub.

In a further advantageous embodiment the processing unit features a hold stage for each receiver to store signaling sequences of the peripheral modules. For signaling sequences which may possibly be present at the same time the event to be processed first can be determined in this way in accordance with rules to be defined.

In a further advantageous embodiment, with more than one hold stage, the processing unit features a priority stage for evaluation of the signaling sequences from the peripheral modules and processing the signaling sequence with the highest priority.

In further advantageous embodiments the hub also features a sample and/or hold stage for storing the signaling sequences to be sent and/or received.

BRIEF DESCRIPTION OF THE DRAWINGS

The invention is described and explained in more detail below on the basis of the exemplary embodiments shown in the figures. The figures show:

FIG. 1 a flow diagram of communication between a processing unit and a peripheral module, FIG. 2 the structure of the inventive signaling sequence, FIG. 3 an embodiment of the inventive system in a daisy-chain structure, FIG. 4 an embodiment of the inventive system in a backplane structure, FIG. 5 an embodiment of the inventive system in a structure with two hubs.

DETAILED DESCRIPTION OF INVENTION

Figure 1:
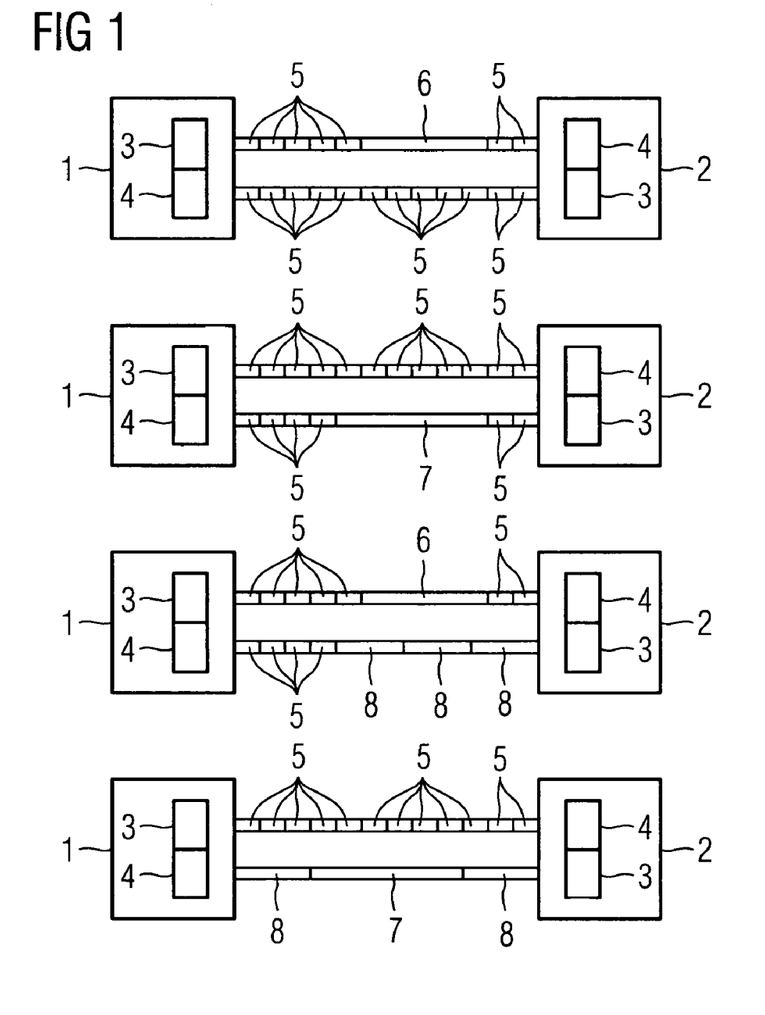

FIG. 1 shows a flowchart of communication between a processing unit 1 and a peripheral module 2. Transmission between these two modules 1, 2 is undertaken using point-to-point-connections between the communication ports 3, 4. For each direction of transmission there is a separate transmission channel. The transmission between a transmitter 3 and a receiver 4 can in this case be based on LVDS (Low Voltage Differential Signaling). This is a differential interface standard for high-speed data transmission (ANSI/TIA/EIA-644-1995, IEEE 1596.3-1996). The pairs of lines between two ports are omnidirectional.

Furthermore the individual symbols of which the data to be transmitted is composed are transcoded into a larger symbol space. This can for example occur with an 8B/10B encoding, i.e. an 8-bit symbol is converted at the transmitter 3 by an encoder into a 10-bit symbol and converted back at the receiver 4 by a decoder into an 8-bit symbol. Thus there remains an unused symbol set, from which specific symbols stand out because of their "safety margin". These special symbols include a further class of symbols—also referred to as comma symbols—which, even with any given combination of these symbols and other symbols, do not create commas across symbol boundaries. These symbols are thus outstandingly well suited for determining the symbol boundaries within the data stream. One of these, the standard idle switch, is transmitted in the telegram pauses between the ports 3, 4 of two modules. This means that the transmission is also synchronized in the telegram pauses.

Normal communication now proceeds by the processing unit 1 sending a request telegram 6 to the peripheral module 2 (top image in the figure) and receives in return from peripheral module 2 a response telegram 7 (second image from the top). If an event is now present in the peripheral module 2 which said module wishes to signal to the processing unit 1, then, instead of the standard idle symbol 5, it sends a signaling sequence 8 which is repeated until such time as the processing unit 1 signals to the peripheral module 2 through the corresponding telegram that the message has arrived at the processing unit 1. During this time the processing unit 1 can also send a further request 6 to the peripheral module 2 (second image from the bottom). In this case the peripheral module 2 can send back the response 7 to the request 6 of the processing unit 1 immediately, since the signaling sequence 8 can be interrupted at any symbol boundary This insures that the normal data transmission will not be influenced (bottom image in the figure). Through this mechanism a "worst case" time can also be specified for the first event message 8 which is only specified by the transfer time of the signaling sequence 8 through the module 2 (in the case of a daisy-chain structure, see FIG. 3) and through the delay time of a maximum-length telegram.

Figure 2:
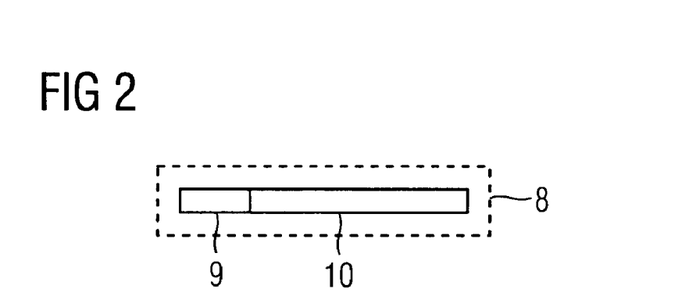

FIG. 2 shows the structure of the signaling sequence 8. This consists of an alarm idle symbol 9 and an alarm identifier 10. In this case the alarm idle symbol 9 is a further symbol from the group of comma symbols, whereas the alarm identifier 10 supplies further information about the relevant message, such as the module address of the relevant peripheral module 2 for example, a priority of the event message 8 and which message information is present at the peripheral module 2.

Figure 3:
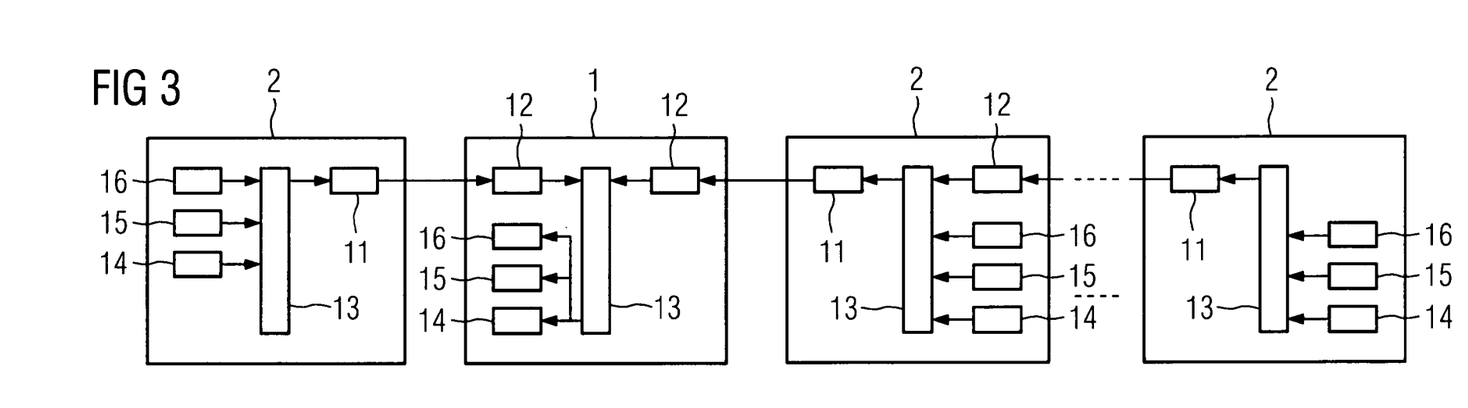

FIG. 3 shows an embodiment of the inventive system in a daisy-chain structure. In this case the system in the example shown in the figure features a peripheral module 2 to the left of the processing unit 1 and further peripheral modules 2 to the right of the processing unit 1. Three different alarm messages 14-16 can be present in each peripheral module 2 in this example. These are fed to a priority stage 13 which evaluates the signaling sequences 8 and forwards the signaling sequence 8 with the highest priority. If two signaling sequences 8 with the same priority are present, a priority defined on the system bus applies, which in this case defines which signaling sequence 8 is forwarded. The resulting signaling sequence 8 which is forwarded by the peripheral module 2, either to a neighboring module 2 or to the processing unit, is held in relevant peripheral modules 2 in a sample stage 11. For this the neighboring module 2 and the processing unit 1 feature a hold stage 12 which receives the incoming signaling sequences 8. In the case in which the signaling sequences 8 are forwarded to a neighboring module 2, this information is fed to the hold stage 12 for evaluation together with the own possible alarm messages 14-16 of the priority stage 13. The processing unit 1 in the example shown features two hold stages 12, in which the incoming signaling sequences 8 are stored and from here are supplied to the priority stage 13, which decides which of the possible alarm message 14-16 will be processed first.

Figure 4:
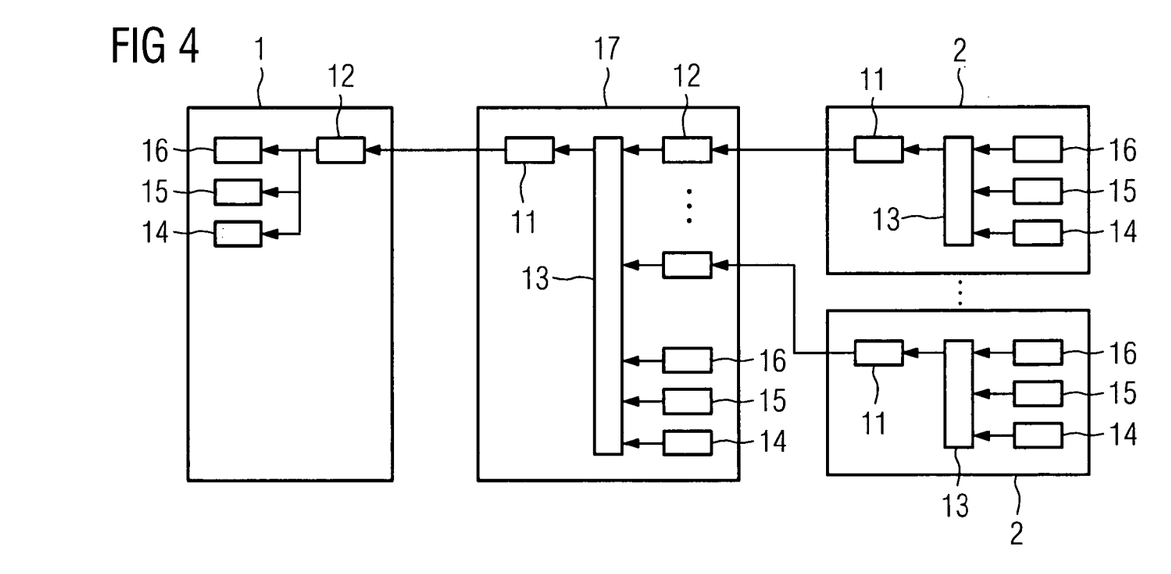

FIG. 4 shows an embodiment of the inventive system in a backplane structure. In this case the system, in addition to the processing unit 1 to the left in the image and the peripheral modules 2 to the right, also features a hub 17, through which the connection between the peripheral modules 2 and the processing unit 1 is established. The structure and operation of the peripheral modules 2 is as described for the outer peripheral modules 2 in the daisy-chain structure in FIG. 3. The signaling sequences 8 sent from the peripheral modules 2 are each stored in the hub 17 in a hold stage 12, i.e. the hub 17 features a hold stage 12 for each peripheral module 2 or for each module slot on the backplane. These signaling sequences 8 are now forwarded with possible own alarm messages 14-16 of the hub 17 to the priority-stage 13 of the hub 17 for prioritization. The resulting signaling sequence 8 which is sent to the processing unit 1 is again stored in a sample stage 11 of the hub. This means that only one signaling sequence 8 arrives in the processing unit 1, so that the processing unit, by contrast with the unit described in the daisy-chain structure, only features one hold stage 12 and thus also does not need a priority stage 13.

Figure 5:
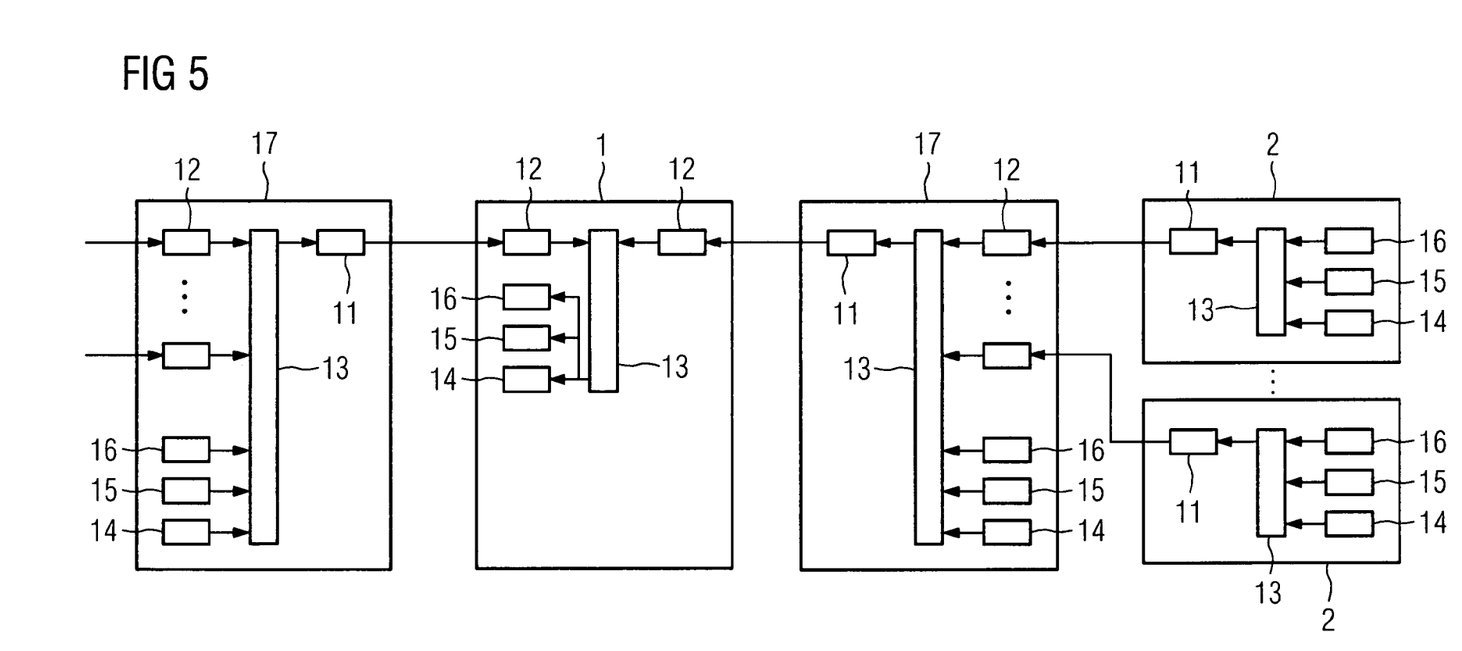

FIG. 5 shows an embodiment of the inventive system in a structure with two hubs 17. In this case the structure essentially corresponds to that depicted in FIG. 4, with an additional hub 17 being located to the left of the processing unit 1. Not shown in FIG. 5 are the further peripheral modules 2, which can be connected to this additional hub 17. Unlike the processing unit 1 depicted in FIG. 4, the processing unit 1 in the structure in this FIG. 5 needs two hold stages 12, in which the signaling sequences 8 sent from the two hubs 17 are stored. It follows from this that the processing unit 1 in the structure with two hubs 17 also needs a priority stage 13 for prioritizing the signaling sequences 8 arriving. For an explanation of the further reference symbols the reader is referred to the embodiments for the previous figures.

To summarize, the invention relates to a method, a bus protocol, a peripheral module, a processing unit, a hub and also to a system consisting of said components for event signaling between at least one peripheral module and a processing unit by means of a system bus. In this case the data to be transmitted is encoded into a larger symbol space, from which a standard idle symbol is used in telegram pauses for synchronizing a connection between transmitter and receiver. The underlying object of the invention is to enable a message present at the peripheral modules to be signaled to the processing unit independently of the telegram traffic initiated by the processing unit. This object is achieved by a peripheral module wishing to signal an event to the processing unit, sending to the processing unit in a telegram pause, instead of the standard idle character a signaling sequence consisting of an alarm idle symbol and an alarm identifier which contain information about the relevant event as well as the module address of the peripheral module at which the event is present, with the information about the event also being transcoded in a larger symbol space.

The invention claimed is:

1. A method for event signaling between at least one peripheral module and a processing unit connected to one another as part of an automation system configured to control an automated process via a system bus, comprising:

establishing a connection with the automation system by way of said at least one peripheral module;

operating the system bus based upon a system bus master, wherein the system bus master reads data from said at least one peripheral module or sends data to said at least one peripheral module;

using individual symbols for the data in a symbol space;

transcoding the data into a larger symbol space by an encoder, wherein the data are transmitted in a bit transmission layer via a transmitter;

using a telegram method for the transmission based upon a request/response paradigm, wherein specific symbols from the larger symbol space are used to identify a start and an end of a telegram, and wherein a standard idle symbol is used in telegram pauses to synchronize a connection between the transmitter and a receiver;

converting back the data via a decoder at the receiver;

sending a signaling sequence by said at least one peripheral module to the processing unit in a telegram pause instead of a standard idle symbol, to signal essentially in real time occurrence of a pending alarm and/or diagnostic event related to the process controlled by the automation system to the processing unit, wherein the signaling sequence has an alarm idle symbol and an alarm identifier, wherein the alarm identifier contains information about the pending alarm and/or diagnostic event related to the process controlled by the automation system and a module address of said at least one peripheral module with the event, and wherein the information about the pending alarm and/or diagnostic event is transcoded into the larger symbol space;

specifying a reaction time for the signaling sequence, the reaction time comprising a time of duration for transmitting the signaling sequence from said at least one peripheral module to the processing unit, and further comprising a delay time when a maximum-length telegram is transmitted before the signaling sequence;

displaying, within said reaction time, the alarm identifier containing the information about the pending alarm and/or diagnostic event and the module address of the peripheral module;

storing in a hold stage of said at least one peripheral module respective signaling sequences of further peripheral modules;

allocating in a priority stage of said at least one peripheral module a respective priority level to the signaling sequence of said at least one peripheral module and to the respective signaling sequences of said further peripheral modules, wherein the priority level of the signaling sequence is dynamically selected based on the importance of the pending alarm and/or diagnostic event related to the process being controlled by the automation system; and forwarding from the priority stage a signaling sequence with a highest priority level, wherein the alarm identifier of each signaling sequence has a field containing the respective priority level.

2. The method as claimed in claim 1, wherein the signaling sequence is interrupted at any given point in a symbol string of the signaling sequence, if a request or a response telegram is sent.

3. The method as claimed in claim 1, wherein the processing unit is used as the system bus master.

4. The method as claimed in claim 1, wherein an interface module is used as the system bus master, wherein the interface module establishes a link between said at least one peripheral module and the processing unit via a field bus.

5. The method as claimed in claim 1, wherein the signaling sequence is sent by said at least one peripheral module until the processing unit signals by a corresponding telegram to the peripheral module that the signaling sequence has arrived at the processing unit.

6. The method as claimed in claim 1, wherein the processing unit and said at least one peripheral module are connected based upon a daisy-chain structure.

7. The method as claimed in claim 1, wherein the processing unit and said at least one peripheral module are connected based upon a backplane structure.

8. The method as claimed in claim 1, wherein the processing unit is a Programmable Logic Controller.

9. A peripheral module for communication with a processing unit connected to one another as part of an automation system configured to control an automated process via a system bus, comprising:
    a transmitter for transmitting data to a system bus master, wherein the data are transcoded for transmission in a bit transmission layer at the transmitter by an encoder into a larger symbol space;
    a receiver to receive data from the system bus master, wherein the data are converted in a smaller symbol space at the receiver by a decoder;
    a telegram method based on a request/response paradigm used for data transmission, wherein specific symbols from the larger symbol space are used to identify a start and an end of a telegram, and wherein a standard idle symbol is used in telegram pauses for synchronizing a connection between the transmitter and the receiver; and
    a signaling sequence for signaling essentially in real time occurrence of a pending alarm and/or diagnostic event related to the process controlled by the automation system to be sent by the peripheral module to the processing unit instead of a standard idle symbol, wherein the signaling sequence has an alarm idle symbol and an alarm identifier, wherein the alarm identifier contains information about the pending alarm and/or diagnostic event as well as the module address of the peripheral module, wherein a reaction time is specified for the signaling sequence, the reaction time comprising a time of duration for transmitting the signaling sequence from the peripheral module to the processing unit and further comprising a delay time when a maximum-length telegram is transmitted before the signaling sequence, and further wherein the alarm identifier containing the information about the pending alarm and/or diagnostic event and the module address of the peripheral module are displayed within the specified reaction time;
    a hold stage configured to store respective signaling sequences of further peripheral modules; and
    a priority stage configured to allocate a respective priority level to the signaling sequence of the peripheral module and to the respective signaling sequences of said further peripheral modules, the priority stage configured to forward a signaling sequence allocated with a highest level of priority, wherein the priority level of the signaling sequence is dynamically selected based on the importance of the pending alarm and/or diagnostic event related to the process being controlled by the automation system, wherein the alarm identifier of each signaling sequence has a field containing the respective level of priority.

10. The peripheral module as claimed in claim 9, wherein the information about the event is transcoded into the larger symbol space.

11. The peripheral module as claimed in claim 9, wherein the peripheral module has a sample stage to store a signaling sequence to be sent.

12. The peripheral module as claimed in claim 9, wherein the peripheral module has at least one further transmitter and at least one further receiver for connecting at least one further peripheral module.

13. The peripheral module as claimed in claim 12, wherein the peripheral module has a hold stage to store signaling sequences from said at least one further peripheral module.

14. The peripheral module as claimed in claim 13, wherein the peripheral module has a priority stage to evaluate the own signaling sequence and to evaluate the signaling sequence of further peripheral modules.

15. The peripheral module as claimed in claim 14, wherein a forwarding of the signaling sequence with a highest priority is based upon the priority stage.

16. The peripheral module as claimed in claim 14, wherein signaling sequences with the same priority are forwarded based upon a priority scheme applicable on the system bus.

17. A processing unit for communication with at least one peripheral module connected to one another as part of an automation system configured to control an automated process via a system bus, comprising:
    a transmitter for transmitting data to said at least one peripheral module, wherein the data are transcoded for transmission in a bit transmission layer at the transmitter by an encoder into a larger symbol space;
    a receiver to receive data from said at least one peripheral module, wherein the data are converted in a smaller symbol space at the receiver by a decoder;
    a telegram method based on a request/response paradigm used for data transmission, wherein specific symbols from the larger symbol space are used to identify a start and an end of a telegram, and wherein a standard idle symbol is used in telegram pauses for synchronizing a connection between the transmitter and the receiver; and
    a signaling sequence for signaling occurrence of a pending alarm and/or diagnostic event related to the process controlled by the automation system to be sent by the processing unit to the peripheral module instead of a standard idle symbol, wherein the signaling sequence has an alarm idle symbol and an alarm identifier, wherein the alarm identifier contains information about the pending alarm and/or diagnostic event as well as the module address of the peripheral module, wherein a reaction time is specified for the signaling sequence, the reaction time comprising a time of duration for transmitting the signaling sequence to the peripheral module and further comprising a delay time when a maximum-length telegram is transmitted before the signaling sequence, and further wherein the alarm identifier containing the information about the pending alarm and/or diagnostic event and the module address of the peripheral module are displayed within the specified reaction time, wherein the processing unit has a hold stage for storing signaling sequences of said at least one peripheral module and further peripheral modules, and wherein the processing unit has a priority stage for evaluating a priority level of the stored signaling sequences and processing a signaling sequence with a highest priority level, wherein the priority level of the signaling sequence is dynamically selected based on the importance of the pending alarm and/or diagnostic event related to the process being controlled by the automation system.

18. The processing unit as claimed in claim 17, wherein the processing unit is a system bus master.

19. The processing unit as claimed in claim 17, wherein the processing unit has at least one further transmitter and at least one further receiver for connecting at least one further peripheral module.

* * * * *